(12) United States Patent
Szybalski

(10) Patent No.: US 8,532,916 B1
(45) Date of Patent: *Sep. 10, 2013

(54) SWITCHING BETWEEN BEST VIEWS OF A PLACE

(75) Inventor: Andrew Szybalski, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/442,287

(22) Filed: Apr. 9, 2012

Related U.S. Application Data

(63) Continuation of application No. 12/574,168, filed on Oct. 6, 2009, now Pat. No. 8,175,794.

(51) Int. Cl.
*G06F 17/30* (2006.01)

(52) U.S. Cl.
USPC .......................................... 701/200; 701/208

(58) Field of Classification Search
USPC ................................. 701/200, 208
See application file for complete search history.

(56) References Cited

U.S. PATENT DOCUMENTS

| | | | | |
|---|---|---|---|---|
| 4,660,037 A * | 4/1987 | Nakamura | ...................... | 340/990 |
| 5,265,024 A * | 11/1993 | Crabill et al. | .................. | 701/538 |
| 5,774,828 A * | 6/1998 | Brunts et al. | .................... | 701/428 |
| 5,945,927 A * | 8/1999 | Nakayama et al. | ...... | 340/995.14 |
| 6,201,544 B1 * | 3/2001 | Ezaki | ............................ | 345/419 |
| 6,697,731 B2 * | 2/2004 | Takayama et al. | ............ | 701/516 |
| 6,748,316 B2 * | 6/2004 | Takayama et al. | ............ | 701/428 |
| 6,748,323 B2 * | 6/2004 | Lokshin et al. | ................. | 701/487 |
| 7,027,073 B2 * | 4/2006 | Bodin et al. | ................... | 345/629 |
| 7,071,843 B2 * | 7/2006 | Hashida et al. | .......... | 340/995.12 |
| 7,149,961 B2 * | 12/2006 | Harville et al. | ............... | 715/202 |
| 7,587,276 B2 * | 9/2009 | Gold et al. | ..................... | 701/426 |
| 7,768,395 B2 * | 8/2010 | Gold | .......................... | 340/539.2 |
| 7,894,984 B2 * | 2/2011 | Rasmussen et al. | .......... | 701/452 |

* cited by examiner

*Primary Examiner* — Kim Nguyen
(74) *Attorney, Agent, or Firm* — Lerner, David, Littenberg, Krumholz & Mentlik, LLP

(57) ABSTRACT

A system and method of selecting and presenting geolocated views. Views may encompass various types of visual and audio information. In one aspect, a server receives a request for information associated with a geographic location. The server identifies a feature at the location. The server uses the identified feature to determine a category of views. The server also selects a view which is associated with the determined category of views and with the geographic location of the request.

20 Claims, 11 Drawing Sheets

|  | View Category 1 | View Category 2 | View Category 3 |
| --- | --- | --- | --- |
| Feature Type 1 |  | First | Second |
| Feature Type 2 |  |  |  |
| Feature Type 3 |  | Third |  |
| Feature Type 4 | First | Fifteenth | Second |
| Feature Type 5 |  | Ninth |  |
| Feature Type 6 | Third |  | Tenth |
| Feature Type 7 | Fourth |  | First |
| Feature Type 8 | Third | Fifth |  |
| Feature Type 9 |  | First |  |
| Feature Type 10 |  |  |  |

FIGURE 4

SWITCHING BETWEEN BEST VIEWS OF A PLACE

CROSS-REFERENCE TO RELATED APPLICATIONS

The present application is a continuation, of U.S. patent application Ser. No. 12/574,168, filed on Oct. 6, 2009, the disclosure of which is incorporated herein by reference.

BACKGROUND OF THE INVENTION

Websites such as Google Maps provide users with the ability to search for locations, such as a street address, and obtain an image associated with the location. The user may often select from different images of the location, such as choosing to view a street level image, a satellite image or a map. Yet further, the service may display multiple images at once, such as a small thumbnail of a street level image overlaid on a satellite image. If the search itself contained the name of a business, the service may also display any photographs uploaded by the business owner next to a map of the location.

BRIEF SUMMARY OF THE INVENTION

One aspect includes a method of providing a view associated with a geographic location. The provided view is one of a plurality of views, each associated with one of a plurality of categories. The method includes receiving a request for information from a user, the request including a location; determining a type of feature disposed at the at the requested location; selecting, with a processor, a view associated with the requested location based on a correspondence between the type of feature and the category of the view; and displaying the selected view to the user.

Another aspect provides a system. The system includes a first computer at a first node of a network. The first computer has access to instructions operable by the first computer and a set of views associated with a geographic location. Each view associated with one of a plurality of view categories. The system also includes a client device at a second node of the network different from the first node. The client device comprises a user input device, an electronic display, a processor and instructions operable by the processor. The instructions of the first computer include receiving a geographic location from a client device; determining a feature type of the geographic location, wherein the feature type is associated with a ranked set of view categories of the plurality of view categories; determining a highest ranked view category associated with the feature type; selecting, if available, a view of the geographic location such that the selected view is associated with the received geographic location and is further associated with the highest ranked view category; and transmitting the selected view to the client device over the network. The instructions of the client device include transmitting a geographic location to the first computer and displaying, on the electronic display, the selected view transmitted by the first computer.

An additional aspect provides a computer-usable recording medium recorded with a program for use by a computing device. The program includes computer code that receives a request for information, the request including a location; computer code that determines a feature type of an object at the requested location; computer code that selects a view of the requested location based on a correspondence between the requested location and the geographic location of the view and a correspondence between the feature type and the category of the view; and computer code that transmits the selected view over a network.

BRIEF DESCRIPTION OF THE DRAWINGS

FIG. 4 is a diagram of a matrix in accordance with an aspect of the invention.

DETAILED DESCRIPTION

The system and method provides a view of a geographic location. The system may include a plurality of views, each view associated with one or more categories of views. In one aspect, when a server receives a request for information associated with the geographic location, the system determines the type of feature that is at the location. The server further selects a category of views based on the feature type, and then selects and provides the requester with an image corresponding with the view category.

Figure 1:
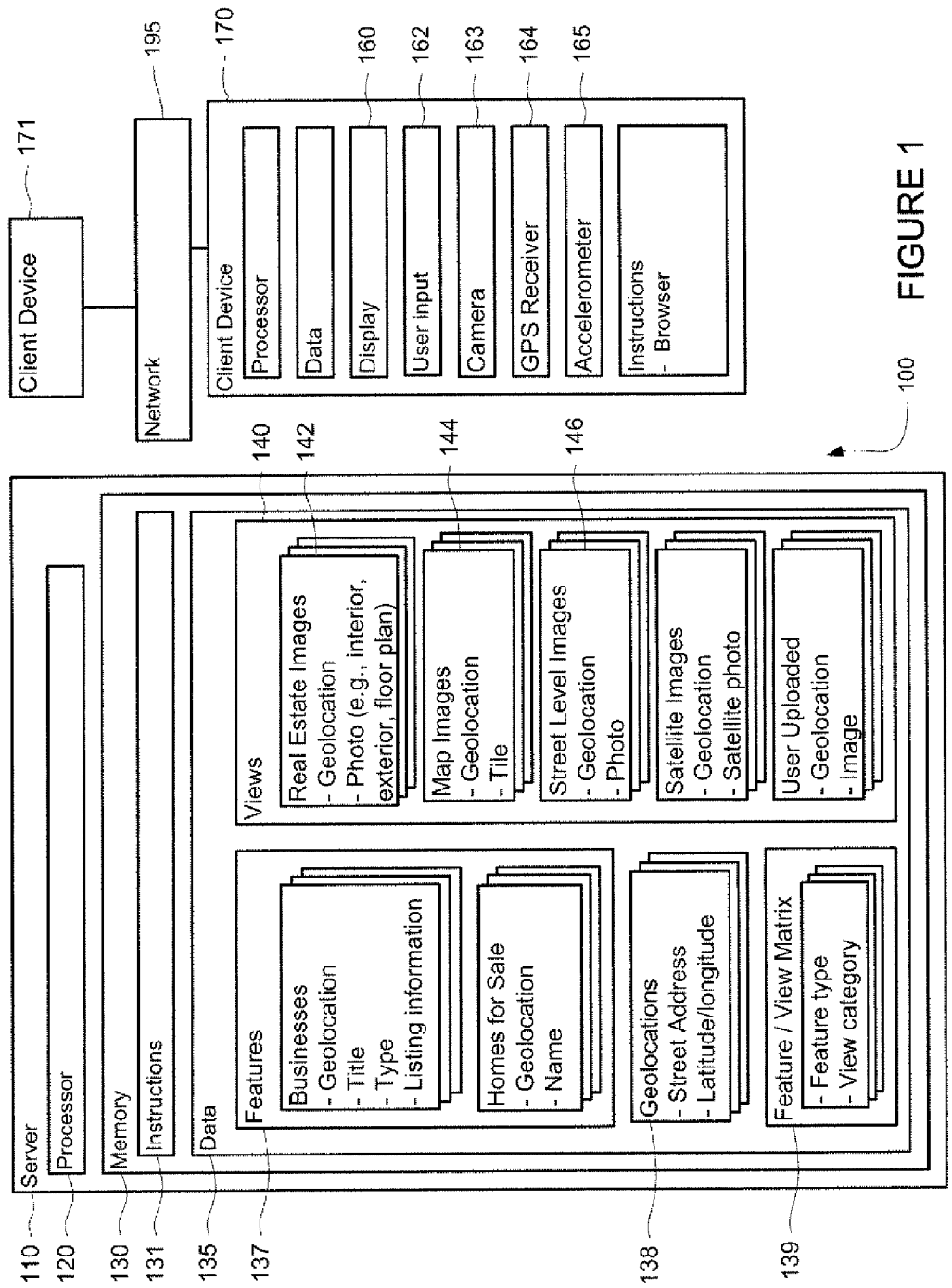
FIG. 1 is a functional diagram of a system in accordance with an aspect of the invention.
Figure 2:
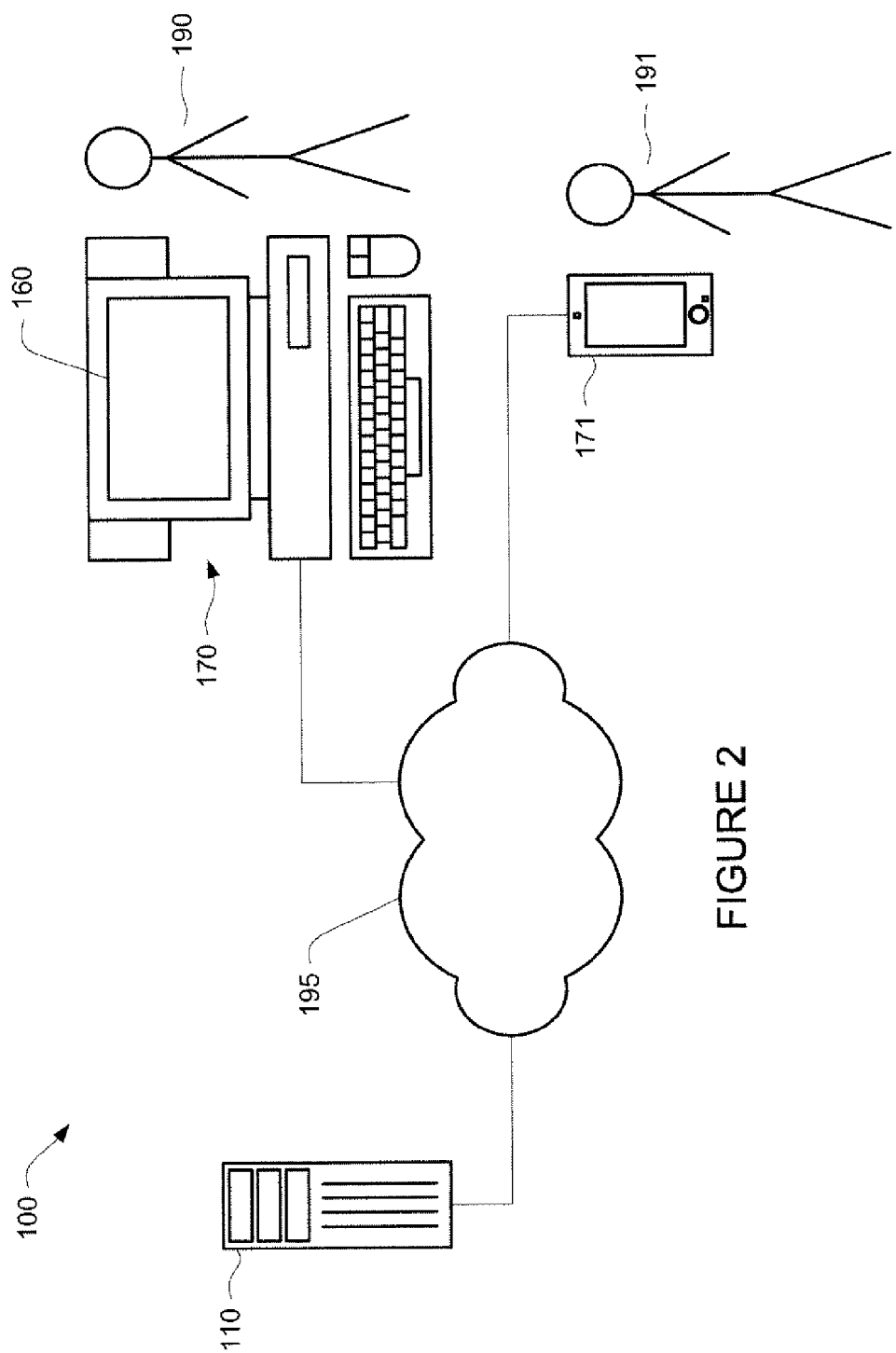
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. It also includes data 140 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or AMD. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 170-71. For example, computer 110 may be web server. Computers 170-171, 180 may be configured similarly to the server 110, with a processor, memory and instructions.

Each client computer 170-71 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by the processor), CD-ROM, hard-drive, user input 162 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the computers 170-71 may comprise a full-sized personal computer, the system and method may also be used in connection with mobile devices capable of wirelessly exchanging data with a server over a network such as the Internet. For example, client computer 170 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA), a camera 163, or any other means of user input.

The client devices may also include a component, such as circuits, to determine the geographic location and orientation of the device. For example, client device 170 may include a GPS receiver 164 to determine the device's latitude, longitude and altitude position. The component may also comprise software for determining the position of the device based on other signals received at the client device 170, such as signals received at a cell phone's antenna from one or more cell phone towers if the client device is a cell phone. It may also include an accelerometer 165 or gyroscope to determine the direction in which the device is oriented. By way of example only, the device may determine its pitch, yaw or roll (or changes thereto) relative to the direction of gravity or a plane perpendicular thereto.

Location and orientation information may be transmitted to the server 110 periodically by a program of the client device or received by server 110 during connection with the client device in conformance with communication protocols. For example, the device may use a browser such as Google Chrome or the browser of the Android operating system, each of which may be configured with user permission to send GPS information to trusted network sites (such as www.google.com). In that regard, it will be understood that a client device's provision of location and orientation data as set forth herein may be provided automatically to the user, to the server, or both.

Server 110 may use the location and orientation information to determine a location of the device. Because the accuracy of GPS determinations may depend on the quality of the device and external factors such as environment, the device may further transmit data indicative of accuracy. For example, the client device 170 may inform the server 110 that the transmitted latitude/longitude position is accurate within 100 meters; i.e., the device may be at any location within 100 meters of the transmitted position. The server may also assume a level of accuracy in the absence of such information.

The server 110 and client computers 170-71 are capable of direct and indirect communication, such as over a network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

A location may be expressed and requested in various ways including but not limited to latitude/longitude positions, street addresses, street intersections, an x-y coordinate with respect to the edges of a map (such as a pixel position when a user clicks on a map), building names, and other information in other reference systems that is capable of identifying a geographic locations (e.g., lot and block numbers on survey maps). Moreover, a location may define a range of the foregoing.

The system and method may translate locations from one reference system to another. For example, the server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)).

In one aspect and as shown in FIG. 1, geolocations 138 defines a set of locations. Each location may be expressed with respect to one or more reference systems. By way of example only, a single geographic location may be expressed as a street address, a latitude/longitude coordinate (estimated or actual) or both. In that regard and in one aspect, each geographic location may further be associated with a unique identifier in addition to street addresses, latitude/longitude coordinates or the like.

Server 110 may identify objects at a particular geographic location with one or more objects, characteristics or features. In that regard, feature types 137 may include associations between a geographic location and a feature. For example, server 110 may identify a feature such as a business or home, disposed at a particular location. Other features include intersections, museums, libraries, and the like. Accordingly, server 110 may identify a feature type (e.g. house for sale or traffic intersection) at a given location. For example, 100 Main Street may be associated with home for sale. Accordingly, server 110 may associate 100 Main Street with the feature type "real estate listing." Similarly, 300 Main Street may be associated with a museum or library, and accordingly, server 110 may associate 300 Main Street with the feature type "public indoor spaces." In another example, the location of "Joe's Barber Shop," or the barber shop itself, may be associated with the feature type "business." Other features may include points of interests such as landmarks, bodies of land or water, points of interest, as well as any item that can be moved or placed at a particular location and represented in the database.

As noted above, an address or location may be associated with multiple features. For example, 200 Main Street may be associated with both an apartment for rent and a barbershop. Therefore, 200 Main Street may be associated with both "realestate" and "business" feature types.

It will be appreciated that the above-mentioned feature types are merely exemplary and, as described below, the system and method may accommodate a variety of such feature types.

Server 110 may access various views 140. A view may include an image, for example, associated with one or more geographic locations. Each view may be associated with one or more view categories, for example, photographs, images uploaded by users, satellite views, aerial views, street level images, images of a building's interior, building plans or schematics, 3-D renderings, live video feeds, streaming video, etc or other conveys different types of information using different types of images. For example, server 110 may have access to real estate images 142 associated with a geographic location. While the views may be associated with geographic locations, the views need not be of the geographic location.

In another example, data 135 may include map images 144 of server 110 may store map-related information, at least a portion of which may be transmitted to a client device. For example, map database 144 may store map tiles, where each tile is a map image of a particular geographic area. Depending on the resolution (e.g., whether the map is zoomed in or out), one tile may cover an entire region, such as a state, in relatively little detail. Another tile may cover just a few streets in high detail. The map images are not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles in response to receipt of a geographical location.

In addition to being associated with geographic locations, some views may be associated with an orientation. For example, street level images 146 are typically associated with information indicating the spatial orientation of the image. If the street level image comprises a typical photograph, the orientation may indicate the camera angle such as data representing an angle that is 30° east of true north and rises 2° from ground level. If the street level images are panoramic images, such as 360° panoramas centered at the geographic location associated with the image, the orientation may indicate the portion of the image corresponding with looking due north from the camera position at an angle directly parallel to the ground.

Data 135 may be associated with one or more matrixes. As will be described in more detail below, the matrixes 139 may identify associations between categories of views, types of features, and user attributes.

Server 110 may have access to one or more databases of information. For example, as noted above, server 110 may have access to a matrix containing associations between categories of views and feature types. Each feature type may be associated with one or more view types. The matrix may indicate which view types are preferred for each feature type.

As shown in FIG. 4, the matrix may include first, second, third, etc. ranked view categories for each feature type. For example, view category 1 is ranked first for feature type 2, but view category 1 is ranked fourteenth for feature type 4. Some view categories, may not have any associated with a particular feature type. For example, there is no association between view category 1 and feature type 1. Still other feature types, for example feature type 2, may not be associated with any particular view categories.

Figure 10:
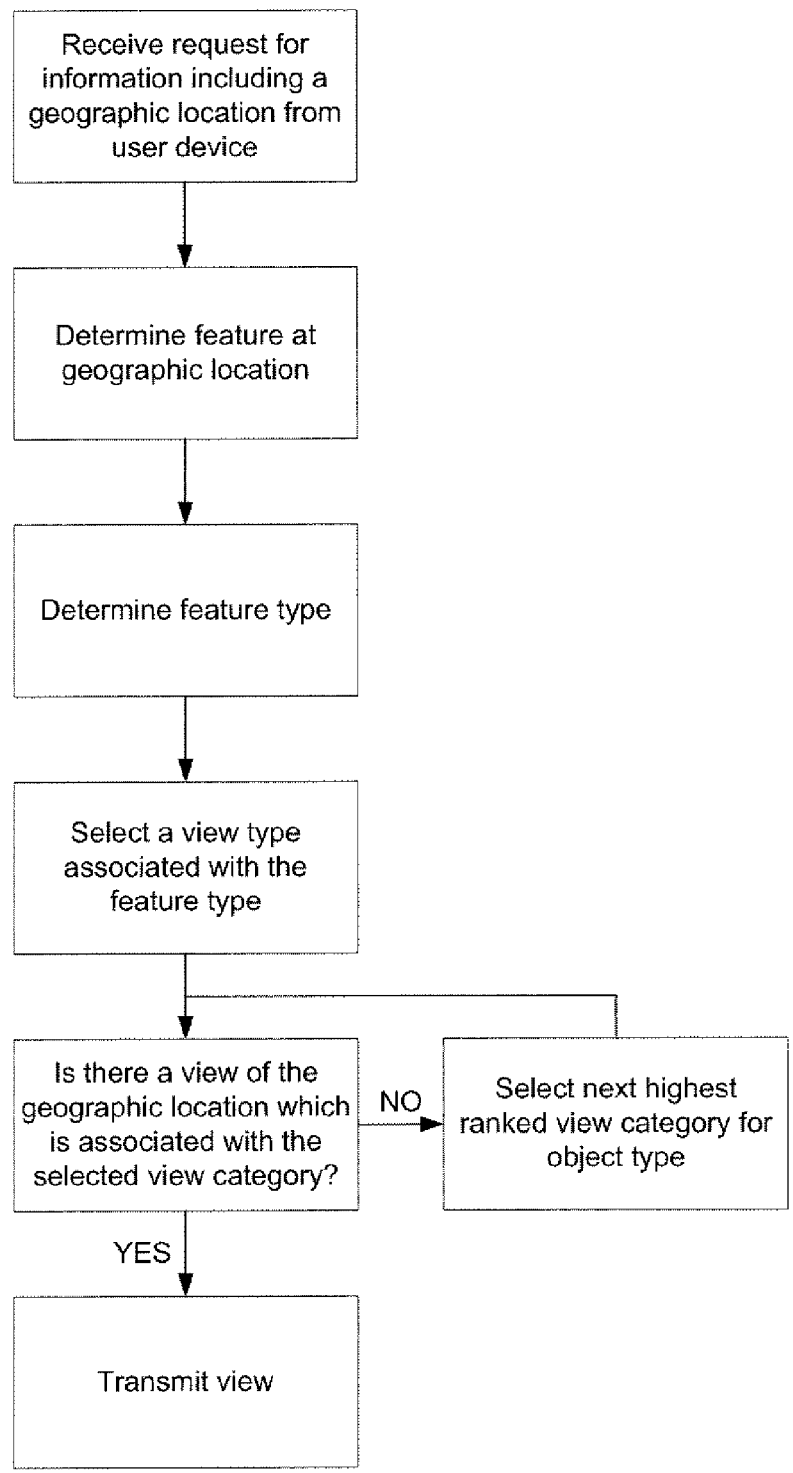
FIG. 10 is a flowchart in accordance with an aspect of the invention.
Figure 11:
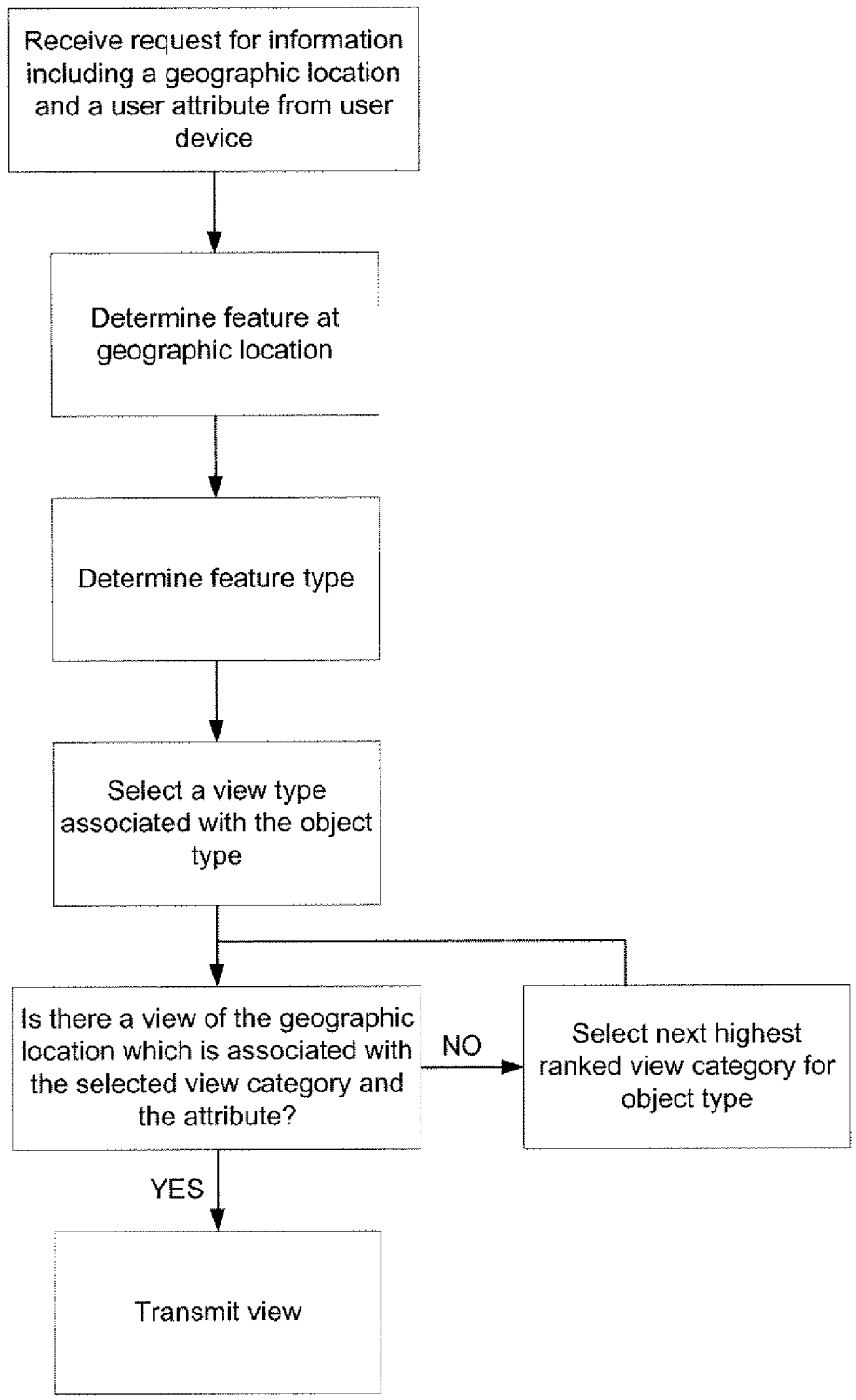
FIG. 11 is a flowchart in accordance with an aspect of the invention.

In addition to the operations illustrated in FIGS. 10 and 11, various operations in accordance with a variety of aspects of the invention will now be described. It should be understood that the following operations do not have to be performed in the precise order described below. Rather, various steps can be handled in reverse order or simultaneously.

Figure 5:
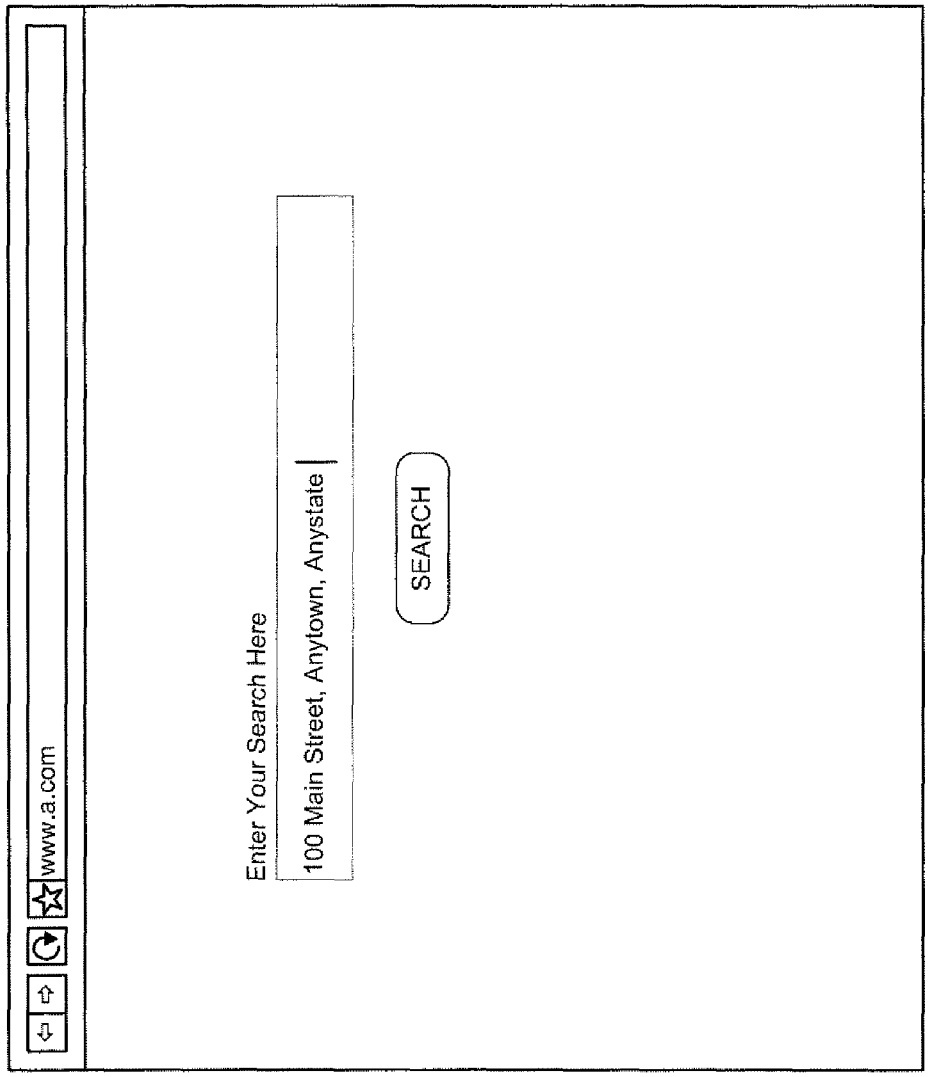
FIG. 5 is a screen shot in accordance with an aspect of the invention.

As shown in FIG. 5, a user may submit a request via a user device to server 110. The request may be associated with a geographic location or locations and may contain various information. For example, the request may include latitude and longitude coordinates, a street address, the name of a business or landmark, an intersection, a transportation hub such as a train station or airport, or a historic event, or the like. The request may also include other information, for example, a date or time.

Figure 3:
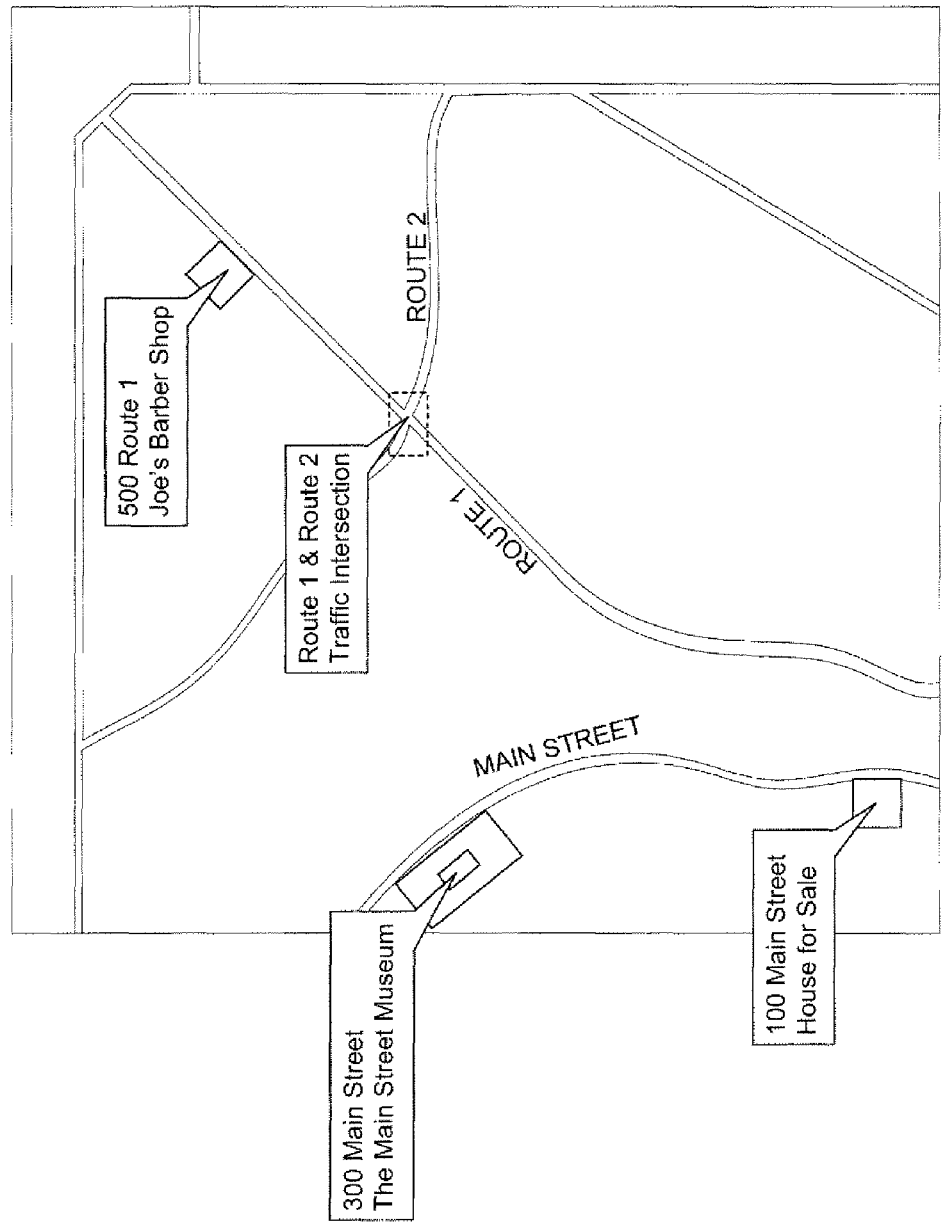
FIG. 3 is a diagram in accordance with an aspect of the invention.

Server 110 may determine if the location is associated with a particular object, characteristic, or feature and assign a feature type. For example, referring to FIG. 3, server 110 may identify a street address such as "100 Main Street, Anytown, Anystate." Server 110 may determine that this location is associated with a home. Accordingly, server 110 may associated this location with the feature type such as "residential home." If server 110 has access to additional information, the server may determine further refine the feature type. For example, if server 110 has identified a current real estate listing for the home at 100 Main Street, the server may associate "100 Main Street, Anytown, Anystate" with a feature type such as "residential home—real estate listing."

Figure 6:
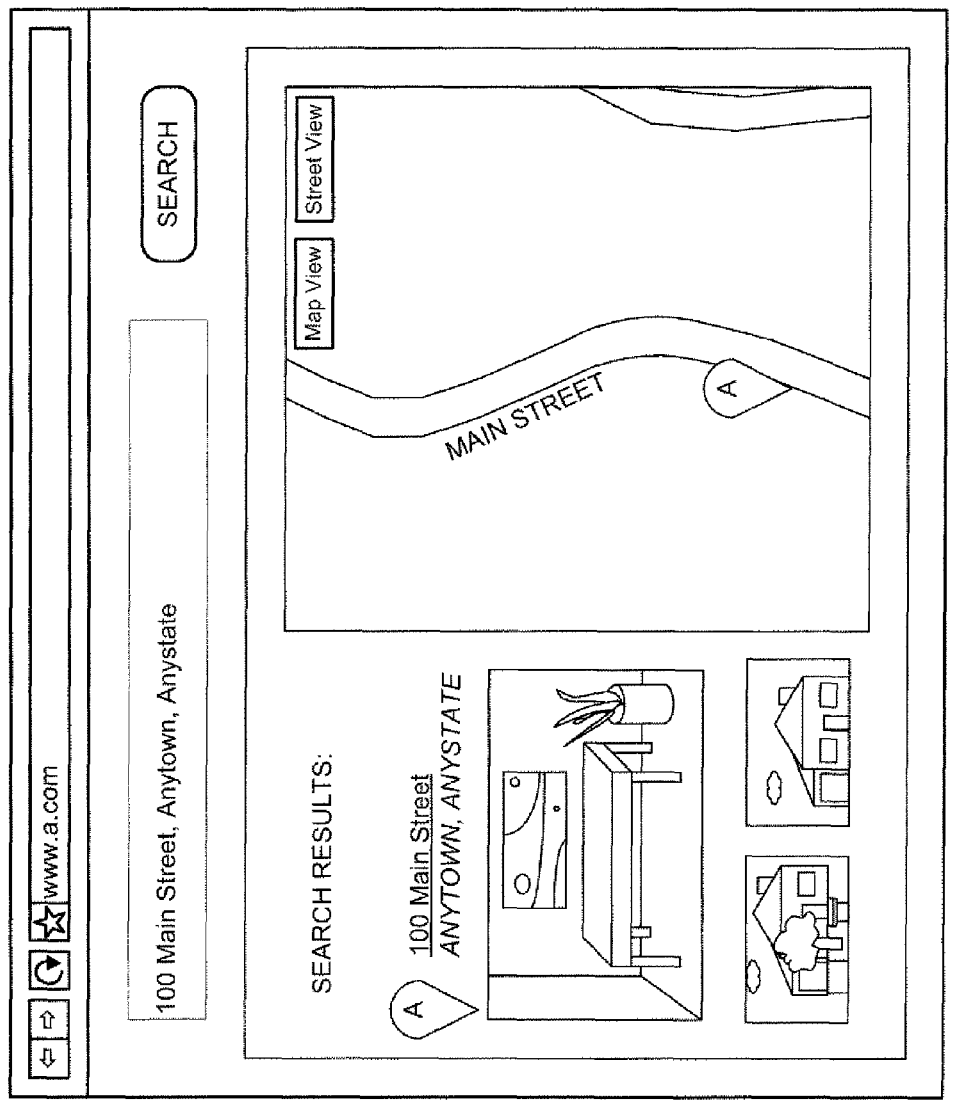
FIG. 6 is a screen shot in accordance with an aspect of the invention.

As shown in FIG. 6, server 110 may use information within the request to determine which views to provide to the user. For example, if the server 110 determines that the feature type of the location is a "real estate listing," it may also determine that the highest-ranked view category comprises interior shots of the home uploaded by a real estate agent. If a view associated with the highest ranked view category is available, server 110 may transmit the view to the user device. If a view associated with the highest ranked view category is not available, server 110 may determine a secondary view category. If a view associated with the secondary view category is not available, server 110 may determine a tertiary view category, and so on. If no ranked view is available, the system may select and display a default view, for example, a map tile.

As shown in FIG. 6, server 110 may provide the client device with the views that were selected based on the type of the feature at the requested location. For example, if a map tile is the highest ranked view, this image may be displayed to the user. In another example, server 110 may provide an image of the backyard, for example, a west-facing oblique aerial photo angled to give the best view of the backyard if such images are associated with the highest ranked view category.

Additional images of lesser rank may also be displayed, though less prominently. For example, the map image 720, which may be associated with the highest ranked view category, may be displayed larger or be more predominant than image of the interior 710. Similarly, interior image 710 may be associated with the highest ranked view category, may be ranked higher and displayed larger than other relevant images 730.

One of the advantages of the invention is its ability to accommodate a wide variety of alternatives and additions to the foregoing features.

The system and method may be used to determine views for a variety of different feature types.

A user request may identify a public space, for example, a mall, library, museum, airport or the like. Server 110 may determine the feature at the location to be associated with a "public indoor space" feature type.

Figure 7:
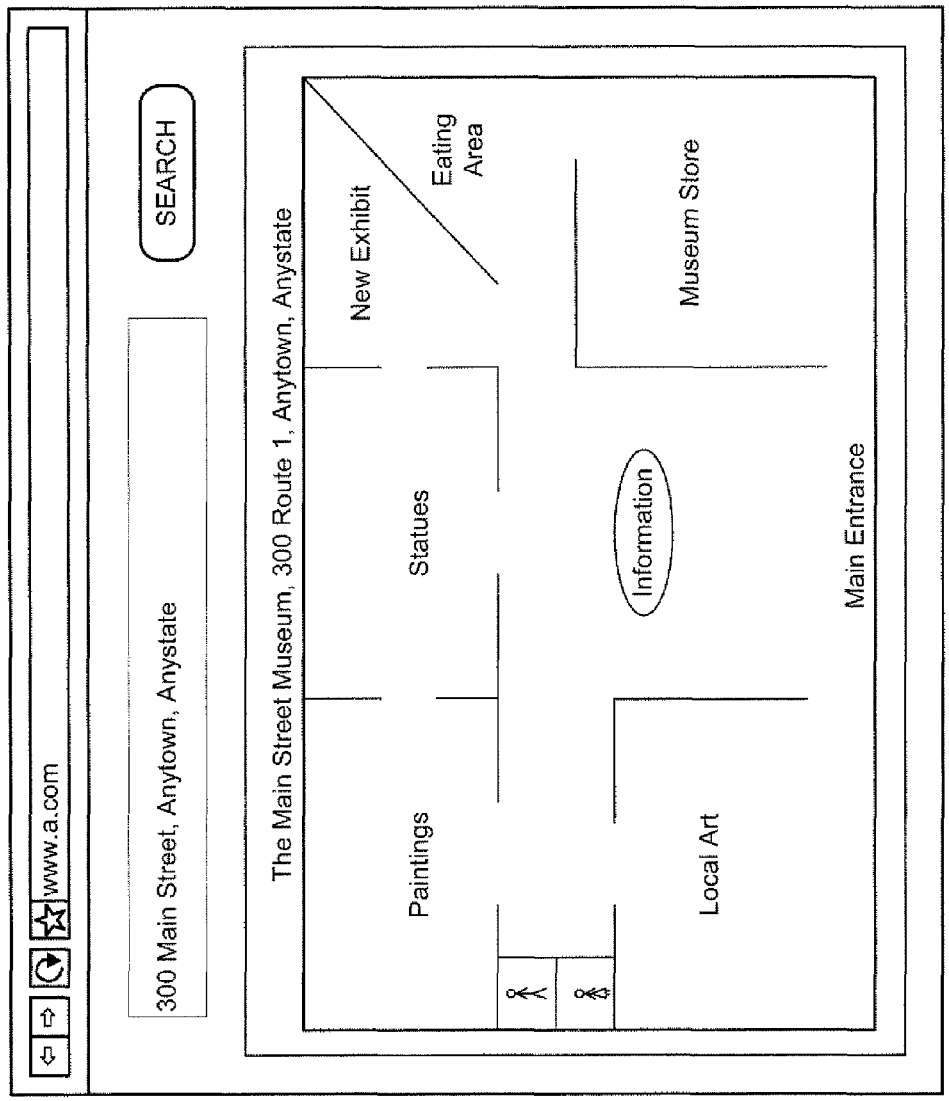
FIG. 7 is a screen shot in accordance with an aspect of the invention.

As shown in FIG. 7, the user may enter the search "300 Main Street, Anytown, Anystate." Server 110 may determine that a public indoor space is located at that addresses, such as a museum. As a result, the server may select a view category (e.g., "floor plan" which depicts different parts of buildings and access routes) that is associated with that type of feature (e.g., "public indoor space"). The screen shot of FIG. 7 demonstrates a sample floor plan of a fictitious museum. Other relevant views of the museum including street level images or a map of the area may also be displayed, although these additional views may be displayed less predominantly than the selected view.

As seen by a comparison of FIGS. 6 and 7, it will be seen that the two queries, "100 Main Street" and "300 Main Street" are nearly identical other than street address. Moreover, neither query provides an indication of the type of view in which the user is interested. Regardless, the system and method infers the user's likely interest based on the feature that is at the requested location, and selects very different types of views for the two different street addresses.

A user request may also identify a location associated with a business, for example a local service provider, a retail location, or a restaurant. Businesses and other locations, may be identified in a search query by a generic name or by proper name. For example, a user may search for the generic "barber shop" and a location or "Joe's Barber Shop" the name of a business.

Figure 8:
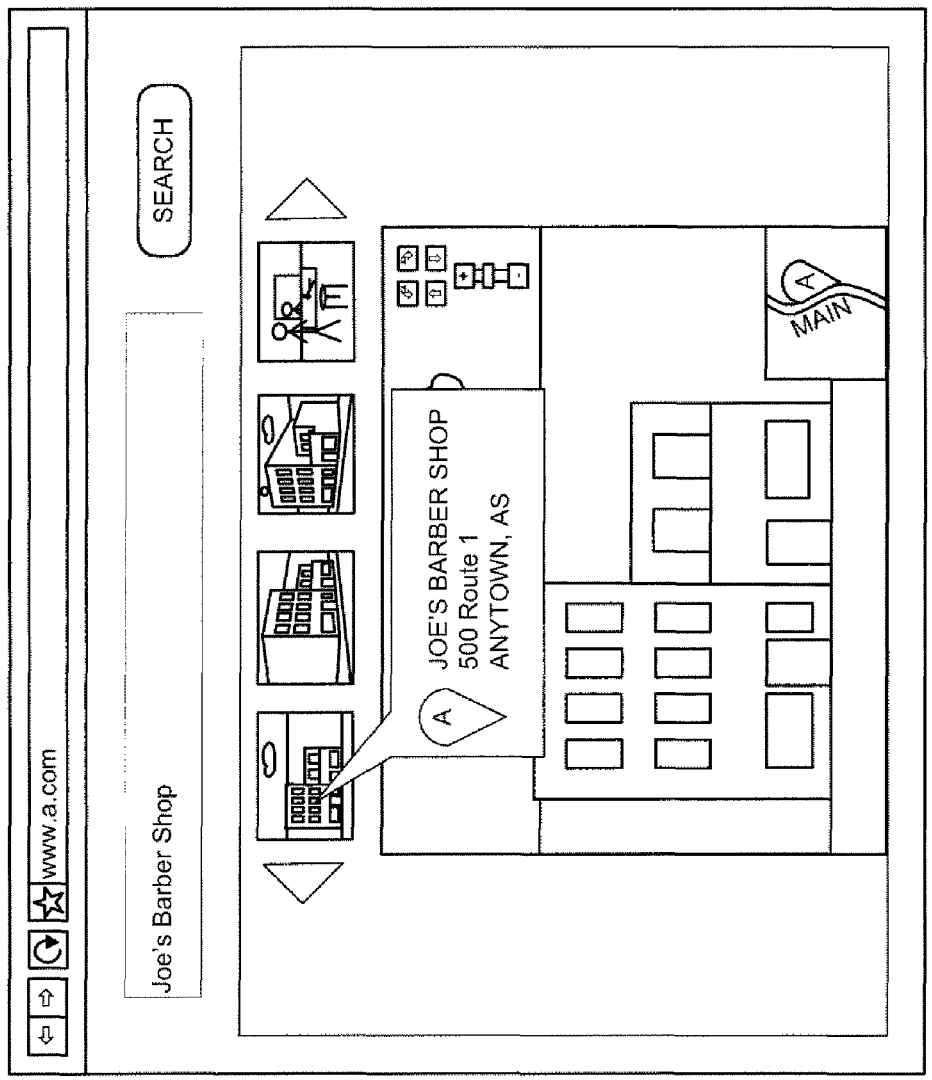
FIG. 8 is a screen shot in accordance with an aspect of the invention.
Figure 9:
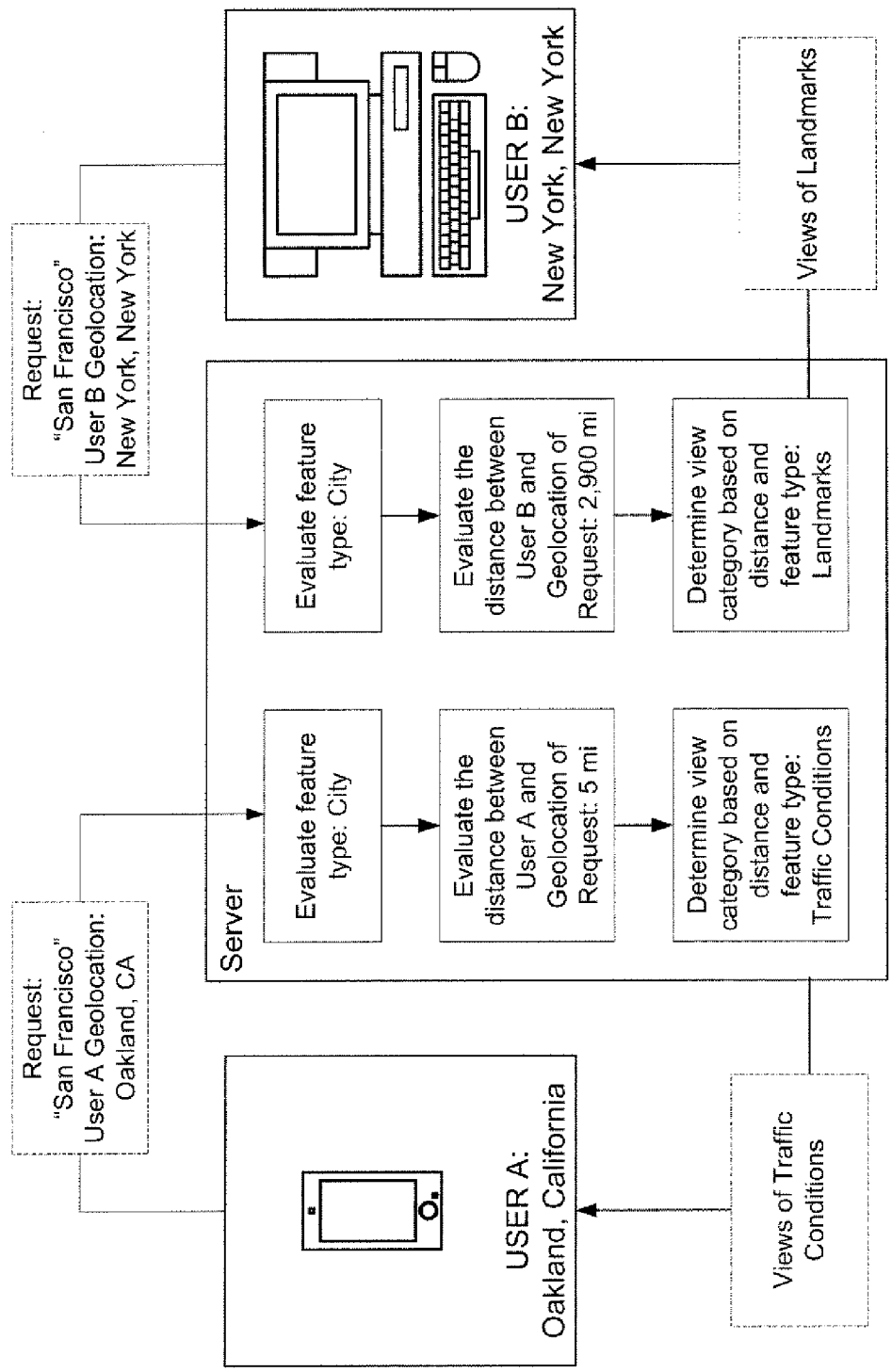
FIG. 9 is a diagram in accordance with an aspect of the invention.

As shown in FIG. 8, the user may search for "Joe's Barber Shop," for example, the name of a local barber shop. Server 110 may determine that the feature type of the location is "business." In that regard, server 110 may also determine that "street images" are the highest ranked views for the "business" feature type. Accordingly, if a street view is available, server 110 may provide the user with a street level image as shown in FIG. 9. Server 110 may also provide the user with a panel of additional views; however, the selected street level image may be displayed in greater detail or in a larger size. The order of the images in the panel may also be determined by the rank of the view category associated with each view.

In another example, a user may request information regarding an outdoor statue, artistic structure, or sculpture. For a structure such as the Eiffel Tower, the highest ranked view category may include views which are artistic or post-card like photos of the location.

In an additional example, the user may request information regarding an intersection. For the highway interchange at Routes 1 and 2, the highest ranked view category may include schematic views showing real time traffic patterns. In a further example, a user may request information regarding a transportation hub such as a train or bus station, and in response, server 110 may provide views which include departure schedules.

In a further example, a user may request information regarding a historical event. For the user query "Woodstock," the highest ranked view may be associated with historical maps of the location or historical photos showing roads, terrain, buildings, or people as they were at the time and place of the event.

It will be appreciated that the view categories and feature types used above are merely exemplary and do not purport to disclose every type, category, or useful combination. In that regard, it will be appreciated that the view categories may also be more specific or more generalized depending on the needs of the system. For example, the search query "barber shop, Main Street, Anytown" may provide various results relating to barber shops on or near Main Street. These results may be ranked according to prominence or relevance to the search query and may be associated with the feature type "business—barber shop." Server 110 may determine that this feature type is associated with the preferred view category of street images of the various barber shops of the results list. Again, a street image may help the user to recognize the location. In another example, the search "Beer Bar, Main Street, Anytown" may be associated with the feature type "business—restaurant/bar" which may be associated with the preferred view category of "interior images." In this example, an interior image of the bar may better help the user determine whether the bar is clean, of a certain type or size, too light or too dark, etc.

Server 110 may also consider other ranking attributes. For example, server 110 may select a next highest ranked view category if the view associated with the higher ranked view category is of low quality. Quality may be determined by examining, for example, clickthrough rate, user ratings, and other ranking statistics such as Google's PageRank. Server 110 may also select and display views based on relevance to the query. For example, if a recently-closed business is at the user's requested location, the server may server may avoid sending a street level image and send a different category of views instead.

While the above examples are limited to images and text, the system and method may also incorporate audio and video views of a location. For example, if a user were searching for "The Restaurant Diner" and the diner was mentioned at a particular part of a video tour of local restaurants, server 110 may provide the user device with a hyperlink which connects the user directly to this part of the video. Server 110 may present this information in conformance with the rank of the view category.

Views may be displayed to the user in a variety of ways. For example, as shown in FIG. 6, thumbnails of a few of the highest ranked views may be displayed along with the results of a search for a location on a map. In another example, a user may select "views of this place" within a general web search or image search. In a further example, users may access a "place page" displaying information about a city or showing highest ranked views of subsidiary places such as "popular places in San Francisco."

The system and method may also be used to generate the "best" or highest ranked view of a place. For example, by examining all of the images uploaded of the Eiffel Tower, the system may synthesize the images to generate an artificial or composite view of the location to conform to the highest ranked view category. The system may determine that the view should be from a particular side or angle, for a particular distance, tilted to prevent cropping part of the Tower, at sunset. The system may utilize 3D rendering, image-based rendering, street level images, uploaded user images, or other views to generate the synthesized image.

In another aspect of the invention, the system and method may include selecting views based on user attributes. An exemplary flow diagram is presented in FIG. 11.

By way of example, the system and method may use the user's own location to select a view category, such as by assuming that local users are more interested in traffic than pictures of landmarks, and vice versa. Server 110 may identify the location of a user through IP address, Wi-Fi signals, location of a wireless base station such as a cell phone tower, GPS information exchanged with the server, or by address information provided by the user. Server 110 may use such information when selecting and transmitting views.

As shown in FIG. 9, the server may receive identical search queries from two users, but provide different views to each user. The server may receive a query associated with a geographic location and determine the location of the user from the query information. The server may evaluate the feature type of the location associated with the query. The server may also determine the distance between the location associated with the query and the location of the user. The view category may be determined based on both the determined distance and the feature type. The server may send views associated with the view category to the user. For example, User A may be located in Oakland (across the bay from San Francisco), about 5 miles from San Francisco. User B may be located in New York City, about 2,900 miles from San Francisco. User A may submit a search query for "San Francisco" and may receive a view of traffic conditions in and around the city. When User B submits the same query, User B may receive views of local landmarks frequented by tourists.

The user's location, and other information specific to the user, may be used to select the view category without regard to the specific query or the feature at the requested location. In yet another example, the user-specific information is used in combination with the feature at the requested location to rank view categories or individual views.

In yet another aspect of the invention, server 110 may use information regarding the date or time of the query. For example, User A may search for "Range Restaurant" in the evening, for example close to dinner time, and User B may perform the same search during the day, for example close to lunch time. The system may provide User A will images of the restaurant at night, whereas User B may be provided with images of the same restaurant during the day. In another example, if a user submits the query "Las Vegas" on a Thursday (i.e., a day closer to a weekend), the user may receive a view of the Las Vegas Strip in the evening. If the same user submitted the same query on a Monday (i.e., a day early in the week), the user may receive a view of well-known landmark during daylight hours.

In other aspects, functions described above as being performed by the server may be performed by the client device, and vice versa. For example, the client device may determine the feature type at a particular location. In yet more aspects, the client device and server perform and share different functions.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method comprising:
receiving a geographic location from a client device;
determining a feature type of a feature at the geographic location, wherein the feature type is associated with a ranked set of view categories of the plurality of view categories in a matrix, the matrix defining ranked relationships between different ones of the feature types and view categories;
determining a highest ranked view category associated with the feature type;
selecting, if available, a view of the geographic location such that the selected view is associated with the received geographic location and is further associated with the highest ranked view category, and when a view of the geographic location associated with the received geographic location and further associated with the highest ranked view category is not available, determining a next highest ranked view category and selecting, if available, a next view of the geographic location such that the next view is associated with the geographic location and is further associated with the next highest ranked view category; and
transmitting the selected next view to the client device.

2. The method of claim 1, wherein the requested location is the name of a business.

3. The method of claim 1, wherein the next view is an image.

4. The method of claim 1, wherein the next view is a video.

5. The method of claim 1, wherein the next view is a map.

6. The method of claim 1, further comprising determining a local time of the request, wherein the next view is selected based upon a correspondence between the local time of the request and a time of day associated with the next view.

7. The method of claim 1, further comprising:
receiving a user attribute from the client device;
extracting information from the user attribute, and wherein the category of the view of the selected next view is further associated with the extracted information.

8. A device comprising:
memory storing a set of views associated with a geographic location, each view associated with one of a plurality of view categories;
a processor coupled to the memory, the processor being operable to:
receive a geographic location from a client device;
determine a feature type of a feature at the geographic location, wherein the feature type is associated with a ranked set of view categories of the plurality of view categories in a matrix, the matrix defining ranked relationships between different ones of the feature types and view categories;
determine a highest ranked view category associated with the feature type;
selecting, if available, a view of the geographic location such that the selected view is associated with the received geographic location and is further associated with the highest ranked view category, and when a view of the geographic location associated with the received geographic location and further associated with the highest ranked view category is not available, determining a next highest ranked view category and selecting, if available, a next view of the geographic location such that the next view is associated with the geographic location and is further associated with the next highest ranked view category; and
transmit the selected next view to the client device over.

9. The device of claim 8, wherein the device comprises one or more web servers.

10. The device of claim 8, wherein the processor is further operable to determine a local time of the request, wherein the next view is selected based upon a correspondence between the local time of the request and a time of day associated with the next view.

11. The device of claim 8, wherein the memory further stores a set of geolocated features, and the processor is further configured to identify the feature based on the set of geolocated features.

12. The device of claim 8, wherein the processor is further operable to:
receive a user attribute from the client device;
extract information from the user attribute, and wherein the category of the view of the selected next view is further associated with the extracted information.

13. A device comprising:
memory storing a plurality of views each associated with one of a plurality of categories, the memory further storing a matrix defining ranked relationships between feature types and view categories, wherein the feature types include the type of the feature disposed at the requested location;
a processor configured to access the memory, the processor being operable to:
receive information identifying a location from a client device;
determine a type of a feature disposed at the at the requested location;
select a view associated with the requested location based on a ranked relationship between the type of the feature and the category of the view defined in the matrix; and
transmit the selected view to the client device.

14. The device of claim 13, wherein the device comprises one or more web servers.

15. The device of claim 13, wherein the processor is further operable to determine a local time of the request, wherein the next view is selected based upon a correspondence between the local time of the request and a time of day associated with the next view.

16. The device of claim 13, wherein the memory further stores a set of geolocated features, and the processor is further configured to identify the feature based on the set of geolocated features.

17. A non-transitory, tangible computer-readable storage medium on which computer readable instructions of a program are stored, the instructions, when executed by a processor, cause the processor to perform a method, the method comprising:
receiving a geographic location from a client device;
determining a feature type of a feature at the geographic location, wherein the feature type is associated with a ranked set of view categories of the plurality of view categories in a matrix, the matrix defining ranked relationships between different ones of the feature types and view categories;
determining a highest ranked view category associated with the feature type;
select, if available, a view of the geographic location such that the selected view is associated with the received geographic location and is further associated with the highest ranked view category, and when a view of the geographic location associated with the received geographic location and further associated with the highest ranked view category is not available, determining a next highest ranked view category and selecting, if available, a next view of the geographic location such that the next view is associated with the geographic location and is further associated with the next highest ranked view category; and
transmit the selected next view to the client device over the network.

18. The storage medium of claim 17, wherein the method further comprises determining a local time of the request, wherein the next view is selected based upon a correspondence between the local time of the request and a time of day associated with the next view.

19. The storage medium of claim 17, wherein the method further comprises:
receiving a user attribute from the client device;
extracting information from the user attribute, and wherein the category of the view of the selected next view is further associated with the extracted information.

20. The storage medium of claim 17, wherein the method further comprises, when the next view is not available, transmitting a default view.

* * * * *

UNITED STATES PATENT AND TRADEMARK OFFICE
CERTIFICATE OF CORRECTION

| | |
|---|---|
| PATENT NO. | : 8,532,916 B1 |
| APPLICATION NO. | : 13/442287 |
| DATED | : September 10, 2013 |
| INVENTOR(S) | : Andrew Timothy Szybalski |

It is certified that error appears in the above-identified patent and that said Letters Patent is hereby corrected as shown below:

In the Claims

Column 11, line 3, claim 7 "over" should read -- over the network --.
Column 12, line 1, claim 13 after "at the" delete "at the".

Signed and Sealed this
Fourth Day of August, 2015

Michelle K. Lee
*Director of the United States Patent and Trademark Office*